(12) United States Patent
Niewiadomski et al.

(10) Patent No.: US 11,440,474 B2
(45) Date of Patent: Sep. 13, 2022

(54) VEHICLE AND SYSTEM FOR DETECTING TRAILER CONNECTION

(71) Applicant: Ford Global Technologies, LLC, Dearborn, MI (US)

(72) Inventors: Luke Niewiadomski, Dearborn, MI (US); Roger Arnold Trombley, Ann Arbor, MI (US); Lihui Chen, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 758 days.

(21) Appl. No.: 16/404,932

(22) Filed: May 7, 2019

(65) Prior Publication Data

US 2020/0353864 A1 Nov. 12, 2020

(51) Int. Cl.
*B60R 1/00* (2022.01)
*B60Q 9/00* (2006.01)
*G07C 5/08* (2006.01)
*G06K 9/62* (2022.01)
*G06T 7/70* (2017.01)
*G06V 20/56* (2022.01)
*G06V 40/10* (2022.01)
*B60D 1/28* (2006.01)
*B60R 11/04* (2006.01)

(52) U.S. Cl.
CPC .............. *B60R 1/00* (2013.01); *B60Q 9/00* (2013.01); *G06K 9/6201* (2013.01); *G06T 7/70* (2017.01); *G06V 20/56* (2022.01); *G06V 40/103* (2022.01); *G07C 5/0825* (2013.01); *B60D 1/28* (2013.01); *B60R 11/04* (2013.01); *B60R 2300/30* (2013.01); *G06T 2207/30252* (2013.01)

(58) Field of Classification Search
CPC ....... B60R 1/00; B60R 11/04; B60R 2300/30; B60R 2300/808; B60Q 9/00; G06K 9/6201; G06T 7/70; G06T 2207/30252; G06V 20/56; G06V 40/103; G06V 10/44; G06V 10/751; G06V 20/59; G07C 5/0825; B60D 1/28; B60D 1/06; B60D 1/62
See application file for complete search history.

(56) References Cited

U.S. PATENT DOCUMENTS

| 7,535,346 | B2 | 5/2009 | Kalous |
| 9,987,892 | B2 | 6/2018 | Ghannam et al. |
| 10,059,161 | B1 | 8/2018 | Salter et al. |
| 10,940,889 | B2 | 3/2021 | Bradley et al. |

(Continued)

FOREIGN PATENT DOCUMENTS

CN 106864187 A 6/2017

*Primary Examiner* — James M Pontius
(74) *Attorney, Agent, or Firm* — Gregory P. Brown; Price Heneveld LLP (57) ABSTRACT

A vehicle is provided that includes a trailer hitch, a camera oriented to capture images of the trailer hitch, and a controller processing the captured images, detecting a trailer safety chain associated with a trailer, determining a connection state of the trailer safety chain to the vehicle, and generating an output indicative of the determined connection state of the trailer safety chain to the vehicle. The vehicle may determine a change in a scene of the captured image following placement of a trailer coupler onto a vehicle hitch and determine a trailer connection state based on the change in scene.

11 Claims, 7 Drawing Sheets

(56) References Cited

U.S. PATENT DOCUMENTS

2006/0038381 A1\* 2/2006 Gehring .................... B60T 7/20
  280/477
2017/0158007 A1\* 6/2017 Lavoie .................. B60W 10/22
2019/0065931 A1\* 2/2019 Ward ........................ B60T 7/20

\* cited by examiner

VEHICLE AND SYSTEM FOR DETECTING TRAILER CONNECTION

FIELD OF THE INVENTION

The present invention generally relates to vehicle trailer connections, and more particularly relates to a system for use on a vehicle for detecting the connection state of the trailer to a vehicle.

BACKGROUND OF THE INVENTION

Many motor vehicles are commonly equipped with trailer hitches that enable the vehicle to connect with and tow a trailer. With many trailer hitch arrangements, the trailer has a coupler that engages onto and connects to the vehicle trailer hitch typically via a hitch ball. The hitch coupler typically includes a coupler lock that is actuated between a locked and unlocked position by actuating a coupler lock lever. The coupler lock ensures that a vertical force is unable to force the coupler off of the trailer hitch during driving of the vehicle trailer combination. In addition, a pair of trailer safety chains which are typically connected to the trailer tongue are configured to be attached to the vehicle hitch to ensure that the trailer will not become disconnected from the vehicle in the event the trailer coupler releases from the hitch. The trailer safety chains are typically fixedly attached to the trailer frame and are configured to removably attach to vehicle trailer hitch or vehicle chassis. In some situations, the vehicle operator may not actuate the coupler lock lever to the locked position and may also not securely attach the trailer safety chains to the vehicle when connecting a trailer to the hitch which can lead to disconnection of the trailer from the hitch. It may be desirable to provide for a vehicle and system that detects that the vehicle and trailer are securely connected while driving the vehicle.

SUMMARY OF THE INVENTION

According to one aspect of the present invention, a vehicle is provided. The vehicle includes a trailer hitch, a camera oriented to capture images of the trailer hitch, and a controller processing the captured images, detecting a trailer safety chain associated with a trailer, determining a connection state of the trailer safety chain to the vehicle, and generating an output indicative of the determined connection state of the trailer safety chain to the vehicle.

Embodiments of the first aspect of the invention can include any one or a combination of the following features:
- the step of detecting the trailer safety chain comprises comparing the captured images to known safety chain images;
- the step of detecting the trailer safety chain comprises recognizing a contour pattern of a chain in the image;
- the step of determining the connection of the trailer safety chain to the vehicle comprises determining a continuous safety chain pattern between the vehicle and the trailer;
- the vehicle includes a display for displaying the output as a warning to a driver of the vehicle;
- the controller further detects the vehicle is in a trailer mode before generating the output; and
- the controller compares the captured images to known images of safety chains stored in memory.

According to another aspect of the present invention, a system for detecting a trailer safety chain connection state between a trailer and a vehicle is provided. The system includes a camera oriented to capture images of a vehicle trailer hitch coupled to a trailer, and a controller processing the captured images, detecting a trailer safety chain connected to a trailer, determining a connection state of the trailer safety chain to the vehicle, and generating an output indicative of the determined connection state of the trailer safety chain to the vehicle.

Embodiments of the second aspect of the invention can include any one or a combination of the following features:
- the step of detecting the trailer safety chain comprises comparing the captured images to known safety chain images;
- the step of detecting the trailer safety chain comprises recognizing a contour pattern of a chain in the image;
- the step of determining the connection state of the trailer safety chain to the vehicle comprises determining a continuous safety chain pattern between the vehicle and the trailer;
- the system includes a display for displaying the output as a warning to a driver of the vehicle;
- the controller further detects the vehicle is in a trailer mode before generating the output; and
- the controller compares the captured images to known images of safety chains stored in memory.

According to yet another aspect of the present disclosure, a vehicle is provided. The vehicle includes a trailer hitch, a camera oriented to capture images of the trailer hitch, and a controller processing the captured images, determining a change in a scene of the captured images following placement of a trailer coupler onto a vehicle hitch, determining a trailer connection state based on the change in the scene, and generating an output indicative of the determined trailer connection state.
- the vehicle further comprises a hitch assist system for assisting with connecting a trailer to the trailer hitch;
- the hitch assist system places the vehicle in a position such that the trailer hitch is coupled to the trailer coupler;
- the hitch assist system includes an active suspension for adjusting a height of the trailer hitch relative to the trailer coupler;
- the change in scene is determined based on detecting a change in position of a trailer feature or detecting a user; and
- the trailer feature comprises one or more of a trailer coupler, a trailer jack assembly and a trailer safety chain.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
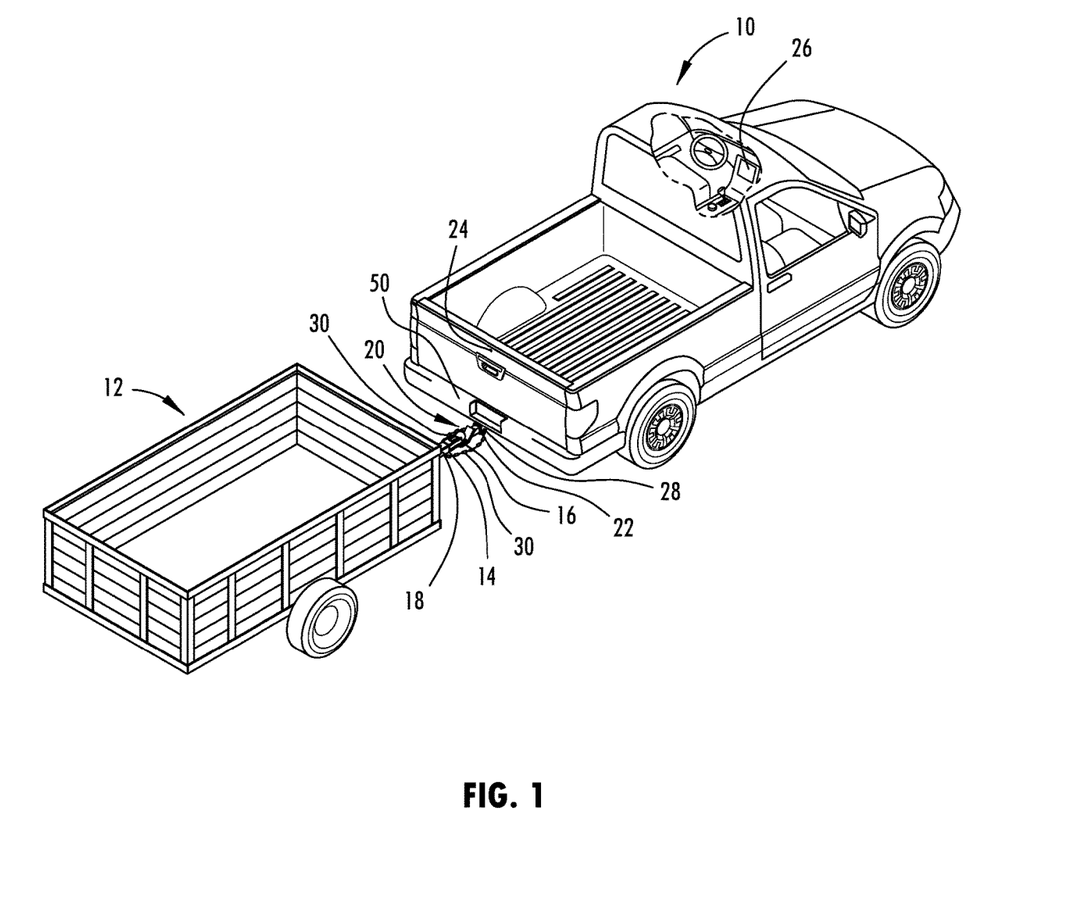
FIG. 1 is a perspective view of a motor vehicle equipped with a trailer hitch connected to a trailer and having a trailer connection detection system, according to one embodiment.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-9, a vehicle 10 and a trailer connection detection system 20 for detecting a connection state of a trailer with respect to the vehicle 10 is generally illustrated, according to one embodiment. The vehicle 10 includes a tow or trailer hitch 22 and has the trailer connection detection system 20 that includes a camera 24 oriented to capture images of the vehicle trailer hitch 22 and a controller processing the captured images, detecting a trailer safety chain associated with a trailer, determining a connection of the trailer safety chain to the vehicle, and generating an output indicative of the determined connection of the trailer safety chain to the vehicle 10.

Referring now to FIG. 1, the vehicle 10 is generally illustrated as a motor vehicle having wheels for travel on the ground such as a roadway. The motor vehicle 10 is equipped with a vehicle trailer hitch 22 mounted or assembled to the rear end, such as the rear chassis, of the vehicle 10. The vehicle trailer hitch 22 generally includes a tow bar extending from a bracket and having a hitch connecting feature such as a tow ball. The trailer 12 has a trailer tongue 14 extending forward at the front end with a trailer coupler 16 provided on the front end thereof. The trailer coupler 16 is configured to engage the tow ball on the vehicle trailer hitch 22 to connect the trailer 12 to the vehicle 10 and allow the trailer 12 to articulate about the coupler-to-hitch connection as the vehicle 10 maneuvers with left and right steering directions while traveling.

The vehicle 10 is equipped with the trailer connection detection system 20 for detecting the presence of one or more trailer safety chains and determining the connection of the one or more trailer safety chains to the vehicle 10. The trailer safety chains typically include metal links connected together in series and having a connector such as a hook at the end for attachment to the vehicle trailer hitch 22. The system 20 includes a camera 24 which is shown located at the rear end of the vehicle 10 and oriented to capture images of the vehicle trailer hitch 22 from an imaging perspective directed rearward of the vehicle 10. The camera 24 is shown located in an upper portion of the tailgate of the vehicle 10 which is shown as a pick-up truck in one example. However, it should be appreciated that the camera 24 may be located in other locations on any vehicle that enables images of the trailer coupler 16, a portion of the vehicle trailer hitch 22 and rear of the vehicle, and the one or more trailer safety chains to be captured. The captured images are stored in memory and processed by a controller of the system 20 as described herein.

In the example shown, the trailer 12 has a pair of trailer safety chains 30 that may be connected to the trailer tongue 14 by way of one or more trailer chain connection bars 18. Typically a trailer is equipped with two trailer safety chains, one safety chain on each of the left and right sides of the trailer tongue 14 and having a sufficient length to connect the connector at the end to one or more chain connector bars 28 provided on the vehicle trailer hitch 22, the vehicle chassis frame or other vehicle structural or supporting member. Typically, a vehicle is equipped with two chain connection bars 28 one on each side of the vehicle trailer hitch 22. The chain connector bars 28 may include welded or bolted bars or an opening formed in a metal sheet that allows a connector, such as a hook, on the front side of the safety chain to securely connect to the chain connection bar 28 and to be removed from the chain connection bar 28 when not in use. The trailer safety chain has a length sufficient to allow connection between the trailer and the vehicle and sufficient slack to enable the vehicle 10 to turn such that the trailer 12 articulates along a desired path without fully extending the chain.

Figure 2:
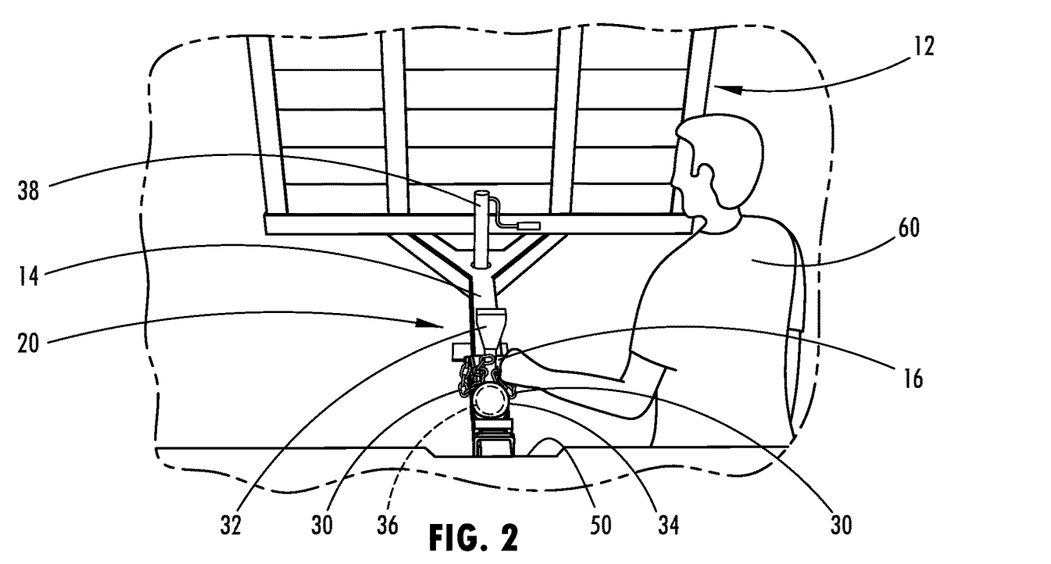
FIG. 2 is a captured image of a scene rearward of the vehicle illustrating the vehicle and trailer connection with trailer safety chains unattached and a user entering the scene, according to one example.
Figure 3:
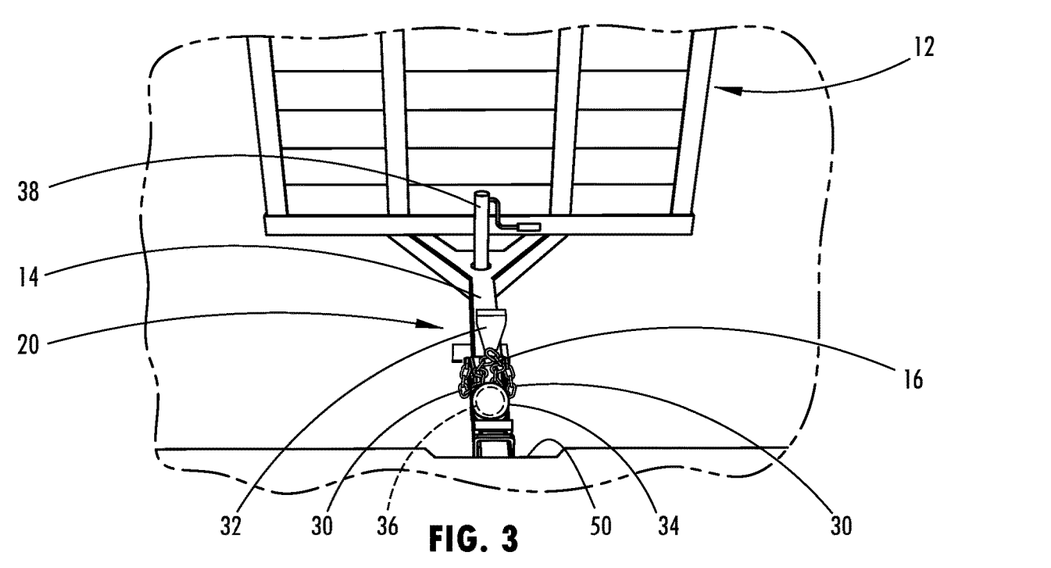
FIG. 3 is a captured image of the vehicle and trailer connection further illustrating the safety chains in the unattached position.
Figure 4:
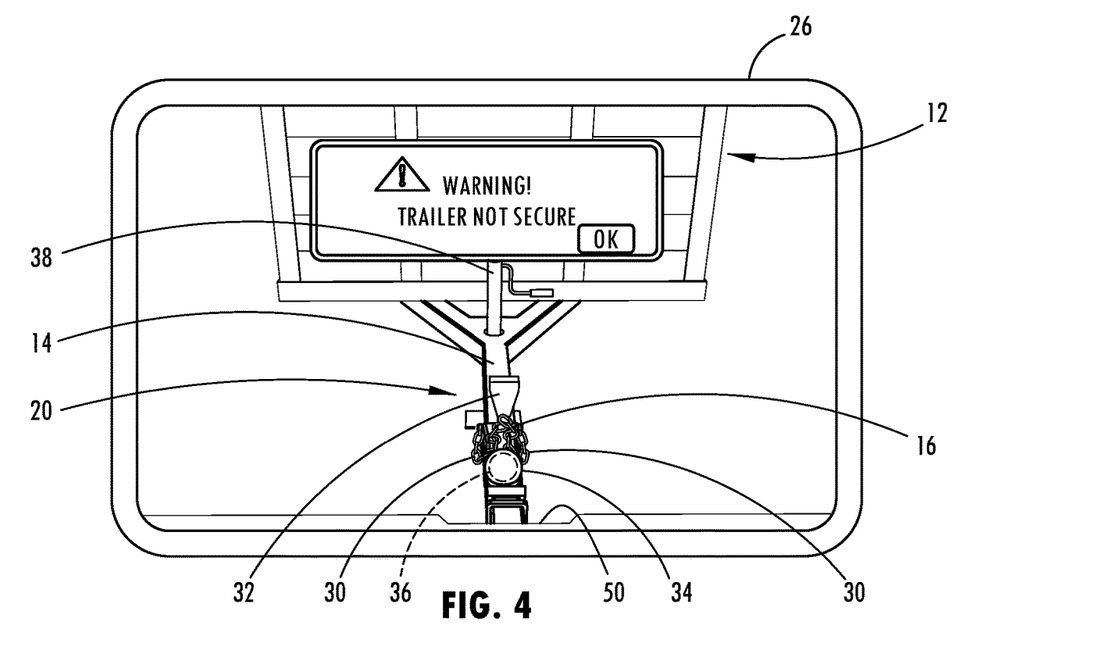
FIG. 4 is a view of the HMI display illustrating an output warning generated by the trailer connection detection system indicating that the trailer is not secure.

In order to connect the trailer 12 to the vehicle 10, the vehicle 10 is typically reversed to a position that enables the trailer coupler 16 to be positioned onto the vehicle trailer hitch 22 as seen in FIG. 2. In this example, the trailer coupler 16 has a forwardmost cap 30 having a generally cylindrical shaped interior volume portion that is open at the bottom side thereof for receiving a hitch ball 36 on the vehicle hitch that is shown in dashed lines. The hitch ball 36 has a spherical portion of a size and shape sufficient to fit within the cap 34, articulate relative to the cap 34 and be releasably captured by the trailer coupler 16. The trailer coupler 16 further includes a coupler lock lever 32 which is shown in a vertical unlocked state in which the trailer coupler 16 may release and become disconnected from the hitch ball. The trailer 12 may include a jack assembly 38 which allows a user 60 to raise and lower the trailer 12 at the front end, particularly at the trailer tongue 14 to position the trailer coupler 16 on the hitch ball 36 and to remove the trailer coupler 16 from the hitch ball 36. Once the trailer coupler 16 is positioned on the hitch ball 36, a user 60 may raise or remove the jack assembly 38 from a stand supporting position and may actuate the coupler lever 32 to lock the trailer coupler 16 onto the hitch ball 36. In some situations, the user 60 may forget to lock the trailer coupler 16 onto the hitch ball 36 which results in the possibility of the trailer coupler 16 inadvertently becoming disconnected from the vehicle 10 when the front end of the trailer 12 is forced upwards. As such, vehicle trailers are typically equipped with a pair of trailer safety chains 30 which are shown in an unconnected position in FIG. 2 where the chains 30 are not attached to the vehicle 10. The user 60 may attach the forward end of each of the trailer safety chains 30 onto the vehicle 10 in a secured position. In FIGS. 2 and 3, the safety chains 30 are left disconnected from the vehicle 10. When this occurs, the trailer connection detection system 20 detects one or more trailer safety chains associated with the trailer 12, and determines a connection of the trailer safety chain 30 to the vehicle 10, and generates an output indicative of the determined connection of the trailer safety chain 30 to the vehicle 10. In the example shown in FIG. 4, the output generates a visual warning message on a display 26 indicating that the trailer 12 is not secure when the trailer safety chains 30 are determined to not be connected to the vehicle 10. It should be appreciated that other types of outputs such as visual and audible outputs and controlled actions such as braking or otherwise controlling the vehicle 10 may be implemented in response to the output.

Figure 5:
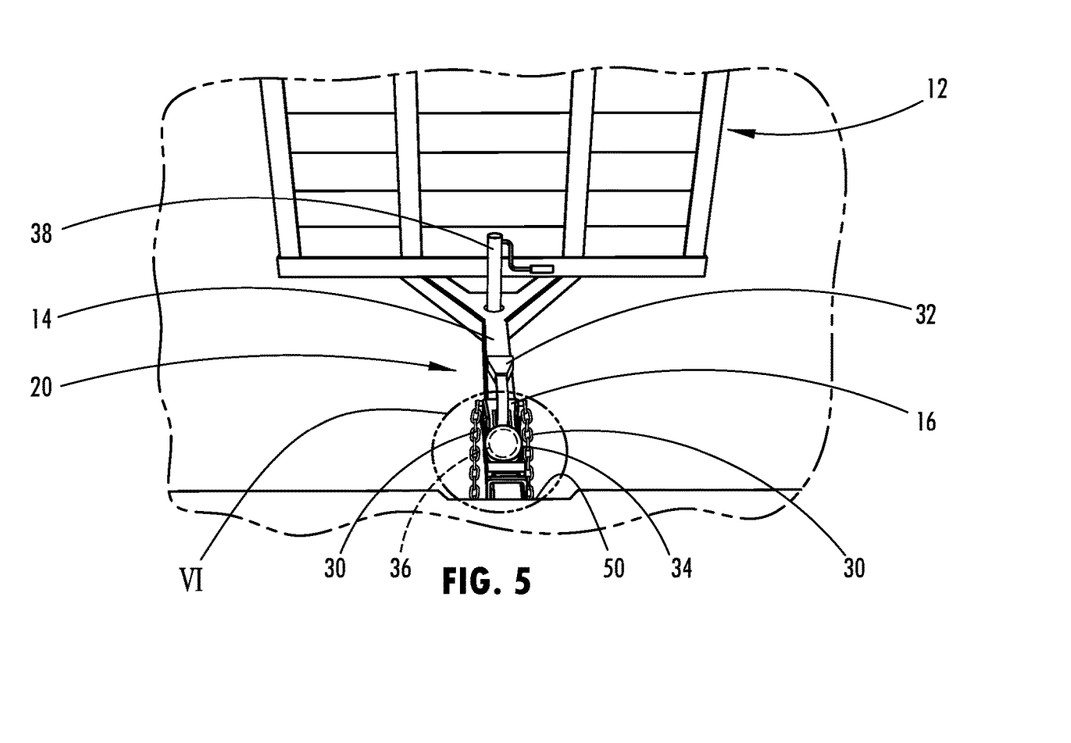
FIG. 5 is a captured image of the trailer vehicle connection illustrating the trailer safety chains connected to the vehicle.

Referring to FIG. 5, an image of the trailer 12 securely connected to the vehicle 10 is illustrated. In this example, the trailer safety chains 30 on opposite sides of the trailer tongue 14 are determined to be connected to the vehicle 10 when the trailer safety chains 30 extend continuously from the trailer 12 to the vehicle 10 in the captured image. In this captured image, the trailer safety chains 30 extend forward from the trailer 12 to the vehicle bumper 50 at the rear end of the vehicle 10. In this example, the vehicle bumper 50 may block a portion of the view of the vehicle trailer hitch 22. In such case, it is presumed that when the trailer safety chains 30 extend from the trailer 12 to the vehicle bumper 50 the chains are secured to the vehicle 10 and the system determines that the trailer safety chains 30 are securely connected to the vehicle 10.

Figure 6:
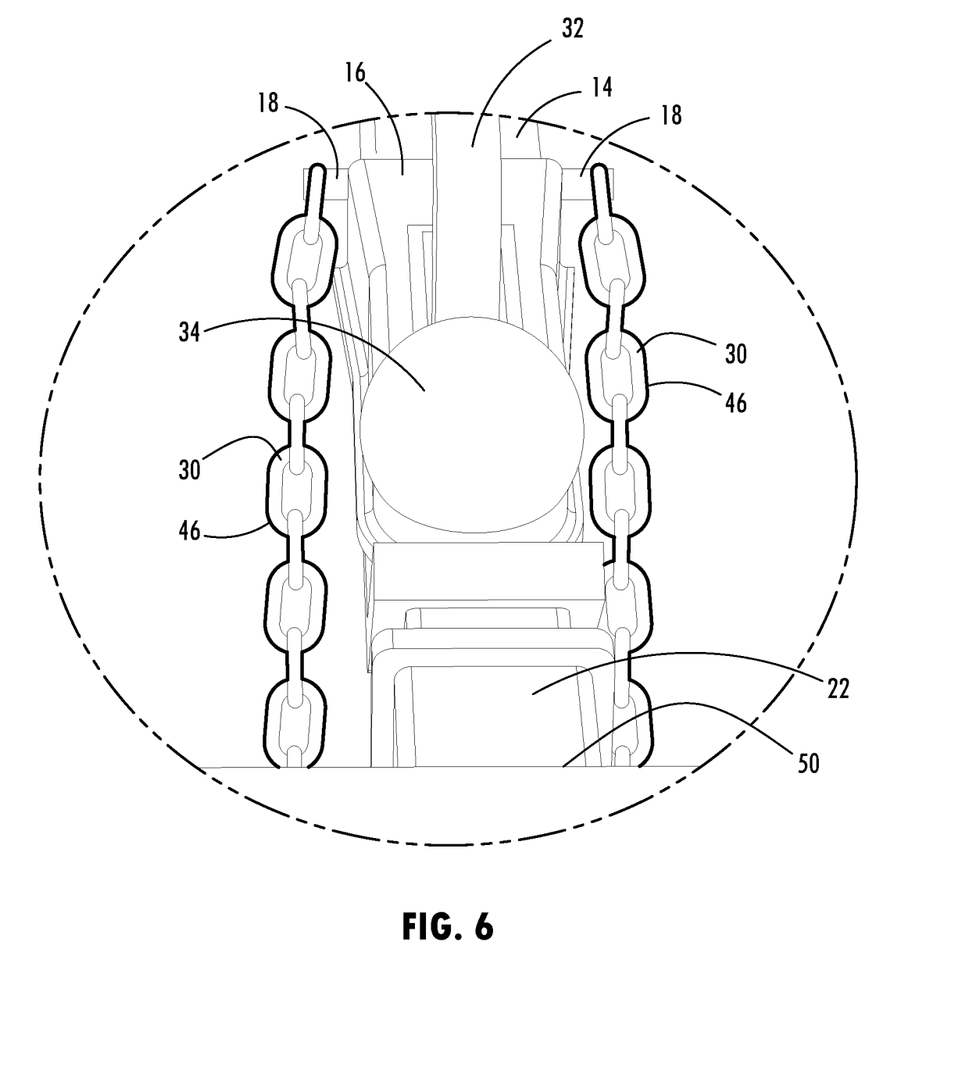
FIG. 6 is an enlarged view of section V-V of FIG. 5 further illustrating a portion of the image with the safety chains shown connected to the vehicle for processing by an image processor.

As seen in the exploded view of FIG. 6, the trailer safety chains 30 are shown having a plurality of interconnected chain linkages. The system controller may employ image processing that compares the captured images of the safety chains to known safety chain images that may be stored in memory. The safety chains 30 in the image may be detected by recognizing a contour pattern of the chain in the image. This may include recognizing the outline of interconnected linkages as shown by the solid outline 46 of the chains 30 in FIG. 6. The image processing may further analyze the detected trailer safety chains to determine that they extend continuously between the trailer and the rear end of the vehicle. This may include comparing the images to known continuous chain connections. The imaging processing may use known imaging recognition techniques to detect the trailer safety chains 30 and determine the continuous connection between a trailer 12 and the vehicle 10.

Figure 7:
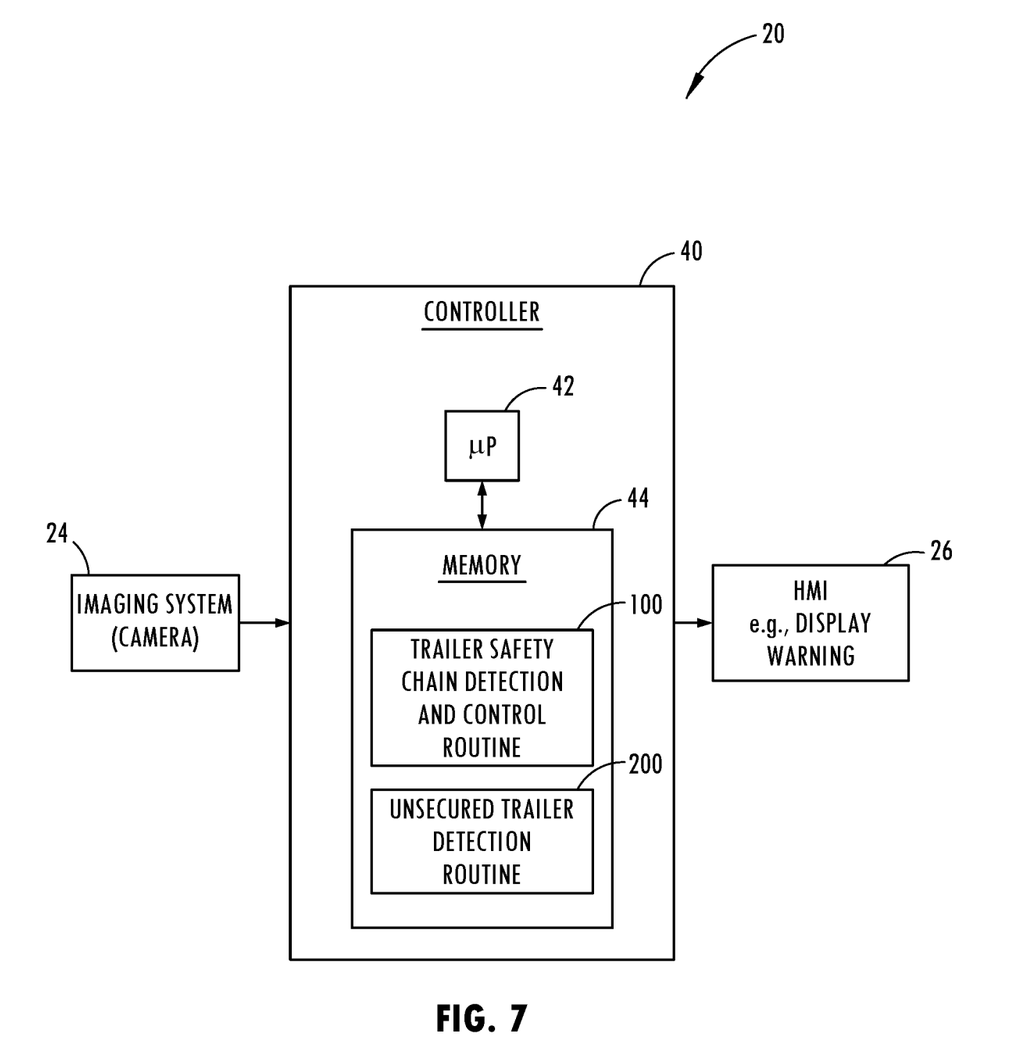
FIG. 7 is a block diagram illustrating the trailer connection detection system and controls, according to one embodiment.

Referring to FIG. 7, the trailer connection detection system 20 is generally illustrated having a controller 40 that receives the images captured by the camera 24 and provides the output to the HMI display 26 as a visual warning. The controller 40 may include a shared controller on a vehicle or may be a dedicated controller dedicated to detecting the connection state of the trailer to the vehicle and providing an output signal and control functions based thereon. The controller 40 may include a microprocessor 42 or other process circuitry. Additionally, the controller 40 includes memory which may store a trailer safety chain detection and control routine 100 and an unsecured trailer detection routine 200. Also stored in memory may be known trailer safety chain images and images of trailer safety chains connected between trailers and vehicles.

Figure 8:
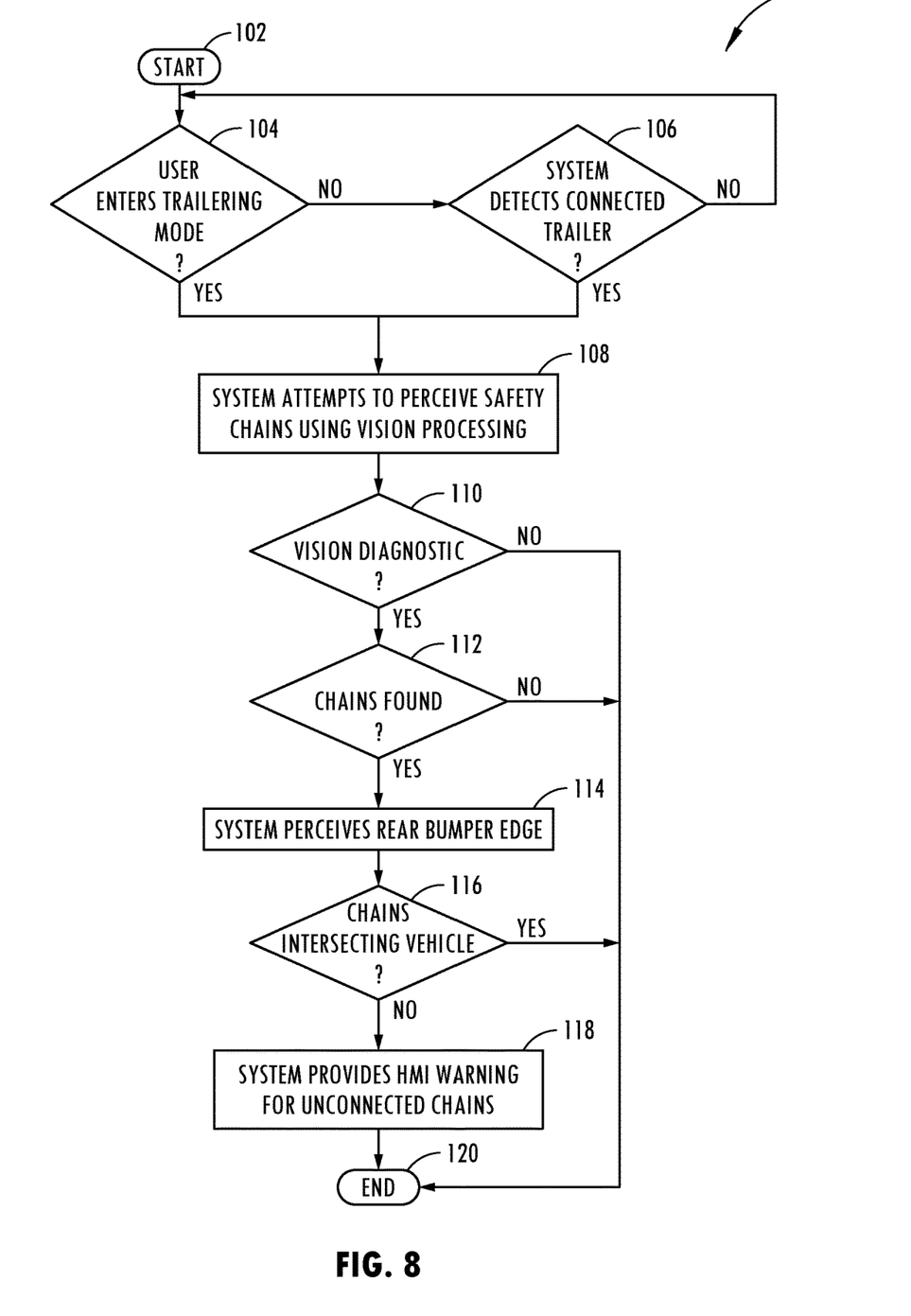
FIG. 8 is a flow diagram illustrating the trailer safety chain detection and control routine, according to one embodiment.

Referring to FIG. 8, the trailer safety chain detection and control routine 100 is illustrated according to one embodiment. Routine 100 begins at step 102 and proceeds to step 104 to determine if a user has entered a trailering mode and, if so, proceeds to step 108. If the user has not entered the trailering mode, routine 100 proceeds to step 106 to determine if the system detects a connected trailer and, if not, returns to step 102. If the system detects a connected trailer, routine 100 proceeds to step 108. The system may detect a connected trailer by employing one or more sensors to detect the presence of a trailer and/or detecting that the trailer wiring system is connected to the vehicle wiring system.

At step 108, routine 100 attempts to perceive the trailer safety chains using vision processing. The system may employ known vision processing techniques such as contour analysis with rules for distinguishing images of a chain as compared to non-chains in the image. Routine 100 then proceeds to decisions step 110 to determine if the vision diagnostics are acceptable. If the vision diagnostics are not acceptable and there is an error, routine 100 ends at step 120. Provided the vision diagnostics are okay, routine 100 proceeds to decision step 112 to determine if the trailer safety chains were located in the image and, if not, ends at step 120, according to one embodiment. In an alternative embodiment, the system could output a message to display to notify the driver that the safety chains were not detected. If the trailer safety chains were located in the image, routine 100 proceeds to step 114 where the system perceives the rear bumper edge of the vehicle or other rearmost portion of the vehicle in the area where the trailer safety chains would be located if connected to the vehicle. Next, at decision step 116, routine 100 determines if the trailer safety chains continue to intersect with the vehicle such that the trailer safety chains are presumed to be continuously connected between the vehicle and the trailer. If the trailer safety chains intersect with the vehicle, routine 100 returns to step 110. If the chains do not intersect with the vehicle, the system determines that the trailer safety chains are not connected to the vehicle and proceeds to step 118 to provide an HMI display warning to notify the driver of the unconnected chains before ending at step 120.

Figure 9:
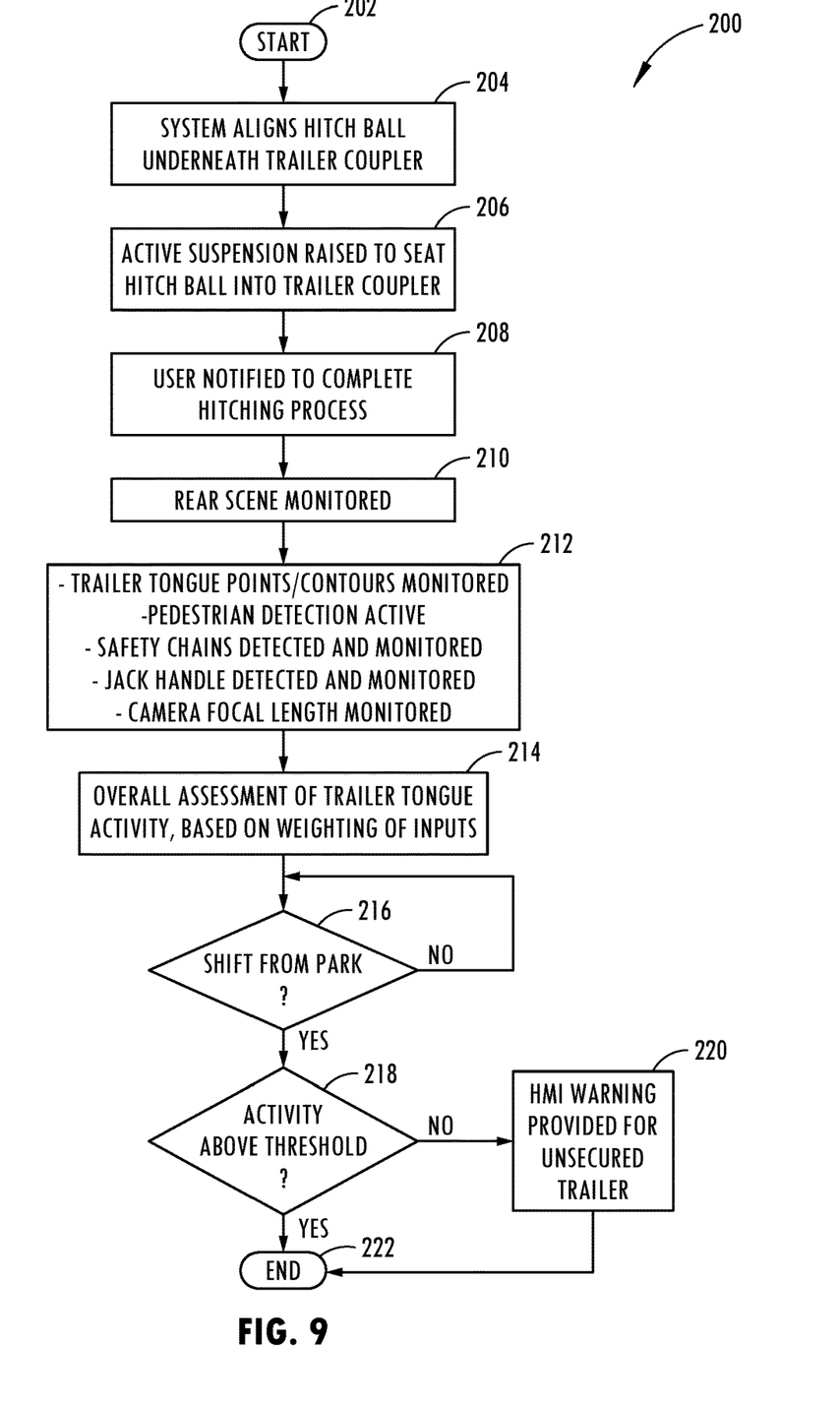
FIG. 9 is a flow diagram illustrating the unsecured trailer detection routine, according to one embodiment.

Referring to FIG. 9, the unsecured trailer detection routine 200 is illustrated, according to one embodiment. Routine 200 begins at step 202 and proceeds to step 204 where the system aligns the hitch ball underneath the trailer coupler. This may be achieved with the use of a hitch assist system which autonomously steers the vehicle into a position aligned with the hitch ball or by manual control where the driver steers the vehicle into an aligned position with the hitch ball. Routine 200 then proceeds to step 206 where an active suspension of the vehicle may be raised to seat the hitch ball into the trailer coupler in position for connection thereto. This may be achieved with automated controls associated with the hitch assist system or via the driver input to lower the trailer with the jack assembly. Next, at step 208, routine 200 notifies a user to complete the hitching process. This typically requires that the user exit the vehicle, enter the rear scene area of the vehicle, and attend to completing the hitching process which may include latching the trailer coupler to a locked position connected to the hitch ball and attaching the trailer safety chains securely onto the vehicle.

After notifying the user to complete the hitch processing, routine 200 proceeds to step 210 to monitor the rear scene rearward of the vehicle. The rear scene is monitored by the camera capturing images of the front portion of the trailer and rear portion of the vehicle. Next, at step 210, routine 200 monitors the captured images and looks for changes in the scene of the captured images rearward of the vehicle in the vicinity of the hitch connection which may include monitoring the trailer tongue points and contours for changes, monitoring for a user or pedestrian detection activity, detecting a change in position of the safety chains, detecting a change in position of the jack assembly such as its handle, and monitoring a camera focal length such as a dynamic focus of the camera. Each of the aforementioned conditions may be indicative of a scene change in the image captured behind the vehicle indicating that there was some activity that occurred after notifying the user to complete the hitching process. Such activity may be indicative of the user completing the hitching process of locking the coupler, connecting the safety chains, lowering and storing the jack assembly and other acts. Next, at step 214, routine 200 determines an overall assessment of the trailer tongue activity based on weighting of inputs, according to one embodiment. For example, a higher weighted value may be assigned to one or more of the factors listed in step 12 and a weighted total value may be used to determine whether sufficient activity occurred in the analyzed image scene. Proceeding to step 216, routine 200 determines if the vehicle initiated a driving event such as shifting the transmission out of park and, if not, waits for that driver initiated event to occur. If the transmission is shifted out of park, routine 200 proceeds to decision step 218 to determine if the detected activity total weighted value was above a threshold and, if so, determines the trailer connection state is secured and ends at step 222. If the activity total weighted value was not above the threshold, routine 200 determines a trailer connection state as unsecured based on the change in scene total weighted value and proceeds to step 220 to issue an HMI displayed warning provided for an unsecured trailer condition before ending at step 222. The determined trailer connection state therefore may be a secured or an unsecured connection state.

Accordingly, the vehicle 10 and trailer connection detection system 20 for detecting the connection of a trailer onto a vehicle and attached trailer safety chains advantageously provides for enhanced vehicle-to-trailer connection identification and generates an output that may allow for a warning or other action to be provided to the driver of the vehicle indicating that the trailer may not be fully secured to the vehicle. As a result, the inadvertent disconnection of a trailer from the vehicle may be prevented. It should be appreciated that the vehicle and system may be employed for trailer towing, in general. Additionally, the system may be more specifically employed for a hitch assist system (also referred to as a "hitch assist" system) which assists with hitching the trailer to the vehicle. In such a situation, a driver of the vehicle is assisted with the trailer hitching process such that the driver may inadvertently forget to attach the trailer safety chains to the vehicle or otherwise secure the vehicle to the trailer upon completion of the vehicle trailer connection.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
a trailer hitch;
a camera oriented to capture images of the trailer hitch;
a hitch assist system for assisting with connecting a trailer to the trailer hitch, wherein the hitch assist system places the vehicle in a position such that the trailer hitch is aligned to be coupled to the trailer coupler; and
a controller processing the captured images, detecting a trailer safety chain associated with a trailer, determining a connection state of the trailer safety chain to the vehicle, and generating an output indicative of the determined connection state of the trailer safety chain to the vehicle, wherein the step of detecting the trailer safety chain comprises comparing the captured images to known safety chain images and recognizing a contour pattern of a chain by recognizing an outline of interconnected linkages of the chain in the image, and wherein the step of determining the connection of the trailer safety chain to the vehicle comprises determining a continuous safety chain pattern between the vehicle and the trailer.

2. The vehicle of claim 1 further comprising a display for displaying the output as a warning to a driver of the vehicle.

3. The vehicle of claim 1, wherein the controller further detects the vehicle is in a trailer mode before generating the output.

4. The vehicle of claim 1, wherein the controller compares the captured images to known images of safety chains stored in memory.

5. A hitch assist system for assisting with connecting a trailer to a trailer hitch and detecting a trailer safety chain connection state between a trailer and a vehicle, the system comprising:
a camera oriented to capture images of the vehicle trailer hitch coupled to the trailer; and
a controller processing the captured images, controlling placement of the vehicle in a position such that the trailer hitch is aligned to be coupled to the trailer coupler detecting a trailer safety chain connected to a trailer, determining a connection state of the trailer safety chain to the vehicle, and generating an output indicative of the determined connection state of the trailer safety chain to the vehicle, wherein the step of detecting the trailer safety chain comprises comparing the captured images to known safety chain images and recognizing a contour pattern of a chain by recognizing an outline of interconnected linkages of the chain in the image, and wherein the step of determining the connection state of the trailer safety chain to the vehicle comprises determining a continuous safety chain pattern between the vehicle and the trailer.

6. The system of claim 5 further comprising a display for displaying the output as a warning to a driver of the vehicle.

7. The system of claim 5, wherein the controller further detects the vehicle is in a trailer mode before generating the output.

8. The system of claim 5, wherein the controller compares the captured images to known images of safety chains stored in memory.

9. A vehicle comprising:
a trailer hitch;
a camera oriented to capture images of the trailer hitch;
a hitch assist system for assisting with connecting a trailer to the trailer hitch, wherein the hitch assist system places the vehicle in a position such that the trailer hitch is aligned to be coupled to the trailer coupler; and a controller processing the captured images, determining a change in a scene of the captured images following placement of a trailer coupler onto a vehicle hitch, determining a trailer connection state based on the change in the scene, and generating an output indicative of the determined trailer connection state, wherein the change in scene is determined based on detecting a change in position of a trailer feature, wherein the step of determining the change in a scene comprises comparing the captured images to known images of trailer features including safety chain images and recognizing a contour pattern of a safety chain by recognizing an outline of interconnected linkages of the chain in the image.

10. The vehicle of claim 9, wherein the hitch assist system includes an active suspension for adjusting a height of the trailer hitch relative to the trailer coupler.

11. The vehicle of claim 9, wherein the trailer feature comprises one or more of a trailer coupler, a trailer jack assembly and the safety chain.

* * * * *